July 29, 1969  L. P. SMITH  3,457,952
SLIDE CONTROL VALVE
Filed Sept. 19, 1966  2 Sheets-Sheet 1
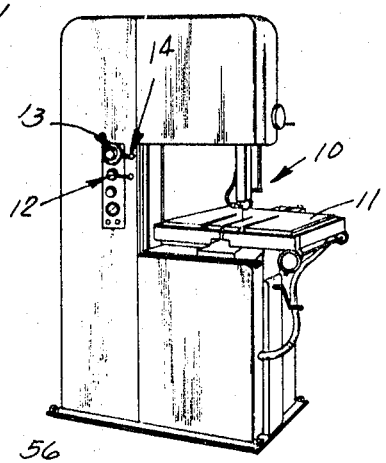
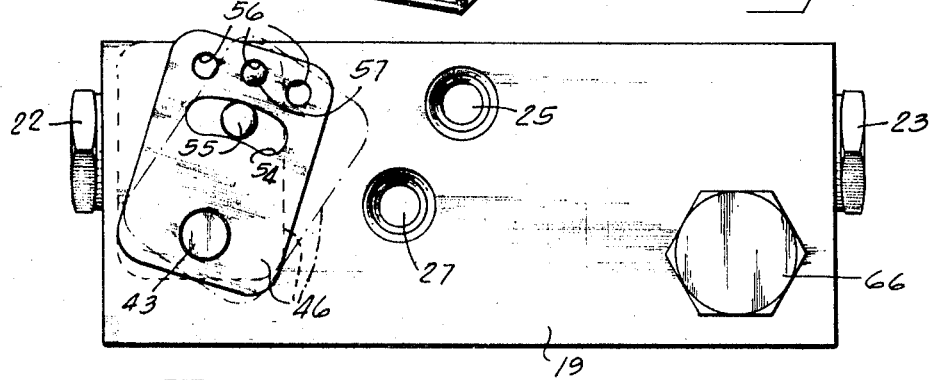
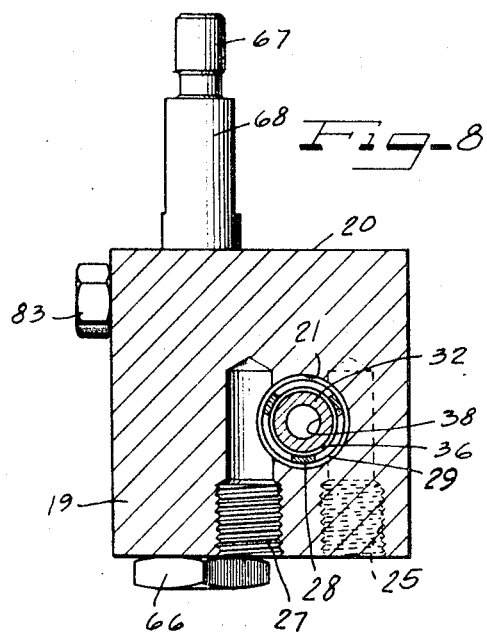
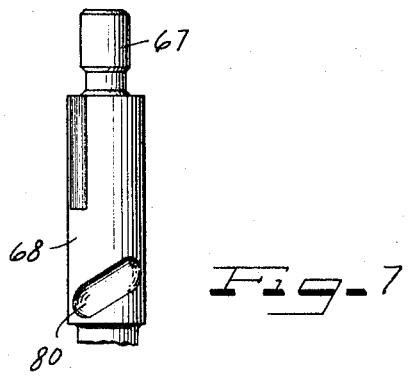
INVENTOR.
LOUIS P. SMITH
BY  ATTORNEYS July 29, 1969   L. P. SMITH   3,457,952
SLIDE CONTROL VALVE
Filed Sept. 19, 1966   2 Sheets-Sheet 2
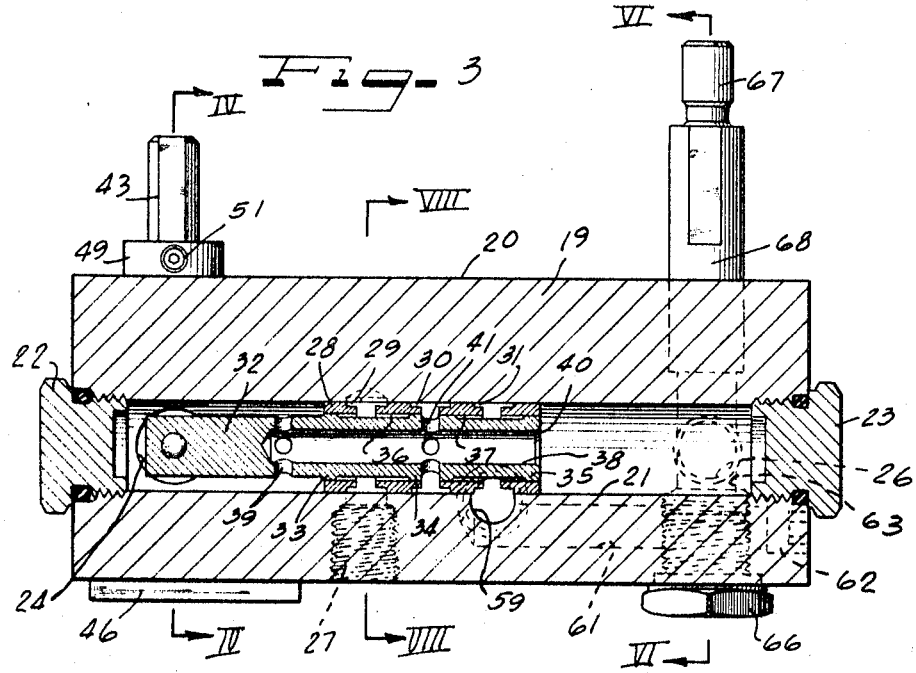
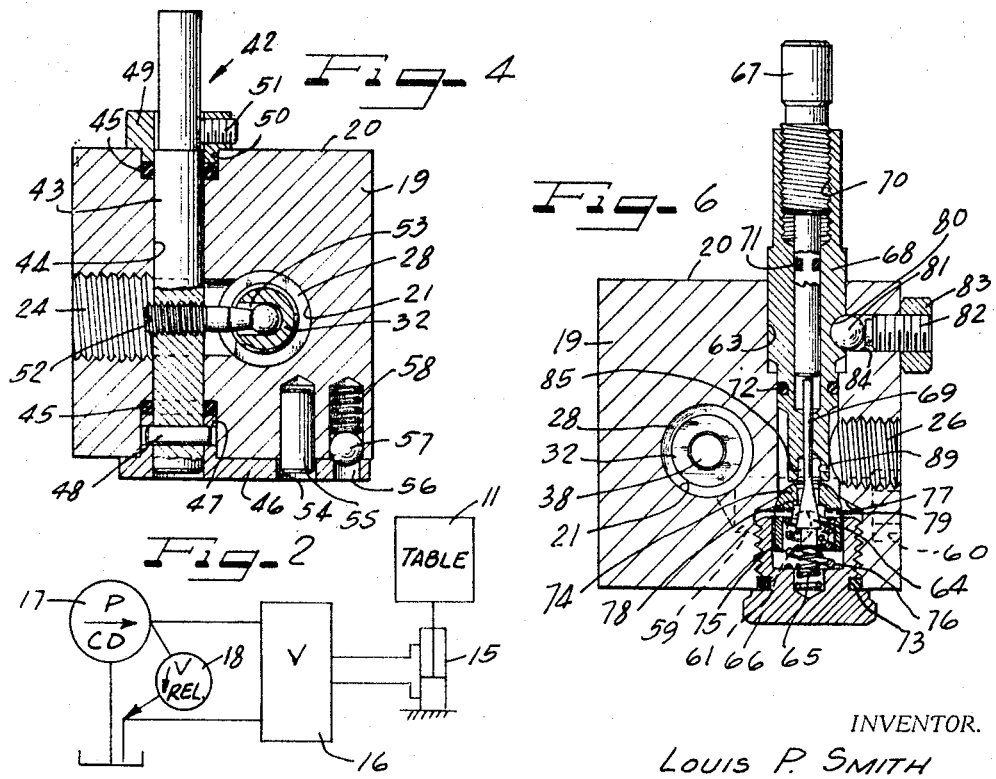
INVENTOR.
LOUIS P. SMITH
ATTORNEYS United States Patent Office
3,457,952
Patented July 29, 1969

3,457,952
SLIDE CONTROL VALVE
Louis P. Smith, McMinnville, Tenn., assignor to Houdaille Industries Inc., Buffalo, N.Y., a corporation of Michigan
Filed Sept. 19, 1966, Ser. No. 580,370
Int. Cl. F16k 3/00, 25/00; F16h 31/12
U.S. Cl. 137—596.2
6 Claims

ABSTRACT OF THE DISCLOSURE

A hydraulic control valve for regulating the movement of a band-saw-table-actuator, to enable forward or reverse movement while locking the actuator when no table movement is desired and at the same time bypassing all the hydraulic fluid to enable a constant delivery pump to be used. One of the actuator ports is provided with a combined metering and check valve, the metering portion and the check valve portion being independently adjustable to obtain the desired feed rate of the table.

---

This invention relates generally to control valves, and more specifically to a hydraulic control valve having manually positionable means for regulating its operation.

Although the principles of the present invention may be embodied in various types of manually controlled hydraulic valves, a particularly useful application is made in a valve as disclosed herein for use in controlling a fluid-power-operated workpiece-supporting-table of a band saw. Such a band saw table supports the workpiece as it is being advanced against the cutting edge of the blade, and such advance is effected at various rates of table movement in a cutting direction, while a somewhat higher rate of movement can be tolerated in a reverse direction, and under special circumstances in a cutting direction. An example of the latter would be when the blade of the band saw extends through an opening in a workpiece and it is desired to advance the table to the point where the saw teeth engage the workpiece. Thus where a band saw table is to be reciprocated by a hydraulic system, it is necessary that the operator be provided with appropriate manual controls for such hydraulic system.

Accordingly, it is an object of the present invention to provide a control valve for use in a hydraulic system for feeding and reciprocating a workpiece-supporting-table of a power band saw.

Another object of the present invention is to provide a control valve having manually positionable means for determining and maintaining fluid flow and direction of flow.

Another object of the present invention is to provide a control valve of the 4-way type wherein the rate of flow in one direction can be manually selected.

A further object of the present invention is to provide a control valve wherein the rate of flow can be manually selected in one direction, the valve including means for overriding such selected rate to provide a higher rate in the same direction without changing such selection.

A still further object of the present invention is to provide a control valve wherein at least one of its functions is manually governed.

Many other advantages, features and additional objects of the present invention will become manifest to those versed in the art upon making reference to the detailed description and to the accompanying drawings in which a preferred structural embodiment incorporating the principles of the present invention is shown by way of illustrative example.

On the drawings:

FIG. 1 is a perspective view of a contour-cutting band saw having a control valve provided for its table in accordance with the present invention.

FIG. 2 is a schematic diagram illustrating external hydraulic connections made to the control valve.

FIG. 3 is a cross-sectional view of a control valve constructed according to the present invention.

FIG. 4 is a cross-sectional view taken along line IV—IV of FIG. 3.

FIG. 5, shown with FIG. 1, is a bottom view of the control valve shown in FIG. 3.

FIG. 6 is a cross-sectional view taken along line VI—VI of FIG. 3.

FIG. 7 is a fragmentary elevational view of a portion of the structure shown in FIG. 6.

FIG. 8 is a cross-sectional view taken along line VIII—VIII of FIG. 3.

As shown on the drawings:

This invention is particularly useful when embodied in a control valve for a contour cutting band saw such as illustrated in FIG. 1, generally indicated by the numeral 10. The band saw 10 includes a table 11 which is reciprocated by a hydraulic actuator under the control of a control valve having three manual actuator controls 12, 13 and 14.

As shown in FIG. 2, the table 11 is reciprocated by an actuator 15 under the control of a control valve 16 which controls flow of a hydraulic fluid from a constant delivery hydraulic pump 17 to such actuator 15, as well as its return to the sump. A relief valve 18 is connected from the outlet of the pump 17 to the sump to accommodate surplus fluid.

The control valve 16 is shown in detail in FIGS. 3–8 and includes a solid body 19 having a mounting surface 20. The body 19 has an elongated bore 21 extending therethrough, the bore 21 being closed at its ends by a pair of plugs 22, 23. The body 19 has an inlet port 24 best seen in FIG. 4 which communicates with the bore 21 at one end thereof as shown in FIG. 3. The body 19 has a return port 25 shown in FIGS. 5 and 8 which communicates with the bore 21 approximately at the center of the length. The body 19 has a first actuator port 26 which communicates through a metering passage described below with the bore 21, and a second actuator port 27 shown in FIGS. 3 and 8 which also communicates with the bore 21. As shown in FIG. 3, there is provided a fixed sleeve 28 held in the bore 21, the sleeve 28 having a first peripheral groove 29 communicating with the actuator port 27, a second peripheral groove 30 communicating with the return port 25, and a third peripheral groove 31 communicating with the actuator port 26. Each of the sleeve grooves 29, 30 and 31 has a number of radial apertures which fluidly communicate such grooves with the inner surface of the sleeve 28.

Within the sleeve 28, there is provided a slide valve 32 that has three peripheral lands 33, 34 and 35 which are separated by a pair of peripheral grooves 36, 37. The slide valve 32 has an axially extending bore 38 which is open as at 39 to one end of the sleeve 28 and as at 40 to the opposite end of the sleeve 28. The center land 34 is cross-drilled as at 41.

The slide valve 32 has three positions which it may assume, the structure being illustrated in the centermost position. In this position, pressurized fluid may enter the inlet port 24 and flow through the openings 39 and 40 to substantially fill the bore 21, and also flow radially outwardly through the openings 41 to the sleeve groove 30 and thence out through the return port 25. As the area of the left end of the slide 32 is the same as that of the right end, the slide valve 32 is fluidly balanced from a pressure standpoint. Under this condition, the lands 33 and 34 seal off the groove 29, while the lands 34 and 35 seal off the groove 31, thereby blocking any fluid flow to or from either of the actuator ports 26 and 27.

When the slide valve 32 is shifted to the left as described below, pressurized fluid will flow around the land 33 into the valve groove 36 and thence via the sleeve groove 29 to the actuator port 27. Fluid being returned through the actuator port 26 will enter the sleeve groove 31 and pass to the second valve groove 37 which will conduct the same to the sleeve groove 30 leading to the return port 25.

When the slide valve 32 is positioned to the right as described below, pressurized fluid from the inlet 24 will pass through the openings 39, through the opening 40 and then around the land 35 to the sleeve groove 31 for conduction to the actuator port 26, while fluid being returned will enter the actuator port 27 and be conducted by the valve's slide groove 36 to the return groove 30 and return port 25.

To shift the slide valve 32 axially, there is provided a first manual actuator generally indicated at 42 (FIG. 4) which includes a rotatable shaft 43 which is rotatably mounted in a second bore 44 in the body 19. The bore 44 is transverse to and adjacent to the bore 21, and both of the bores 21 and 44 are intersected by the inlet port 24 as shown in FIG. 4. At its opposite ends, the bore 44 is enlarged and receives a pair of sealing O-rings 45, 45, there being a plate 46 having a hub 47 secured by a pin 48 corotatably to the one end of the shaft 43, and there being a retainer bushing 49 having a hub 50 held by a set screw 51 to the opposite end of the shaft 43. The hubs 47 and 50 act against the sealing rings 45. The shaft 43 has a transverse threaded aperture aligned with the inlet port 24 in which there is disposed a finger 52 which projects radially from the shaft 43 into a recess 53 in the slide valve 32. The distal end of the finger 32 is rounded, as is the recess 53, to form a type of ball and socket connection therebetween. When the shaft 43 is moved part of a turn in one direction, the slide valve 32 shifts in one direction, and when the shaft 43 is moved in the opposite angular direction, the slide valve 32 is moved in the opposite direction. The manual actuator control or actuator knob 12 shown in FIG. 1 is secured to the outer end of the shaft 43 for effecting such movement thereof.

To limit the extent of movement, the plate 46 is provided with a slot 54, best seen in FIG. 5, and the body 19 is provided with a pin 55 projecting into such slot and cooperating with it to limit travel of the slide valve 32. The plate 46 is provided with three arcuately arranged apertures 56 which successively register with a ball 57 loaded by a spring 58 as shown in FIG. 4. The apertures 56 and the ball 57 jointly comprise a three-position detent structure for holding the plate 46 in a selected one of the three positions as illustrated in FIG. 5, and thereby holding the shaft 43 correspondingly.

Passage means are provided which connect the actuator port 26 with the sleeve groove 31. As shown in FIGS. 3 and 6, the body 19 has a transverse passage portion 59 which leads directly at its inner end to the sleeve groove 31 and which is closed at its outer end by a removable plug 60. The passage portion 59 is intersected near its center by a further passage portion 61, also shown in FIGS. 3 and 6, which is likewise closed at its outer end by a removable plug 62. The passage portion 61 is intersected by a further passage portion 63 in the nature of a bore which extends through the body 19 and which is slightly enlarged at each end. The passage portion or bore 63 is intersected by the actuator port 26 as shown in FIGS. 3 and 6. Within the passage portion 63, there is disposed an adjustable metering valve 64 for controlling the rate of fluid flow to the actuator port 26, and normally only in such direction. A spring 65 acts between a sealing cap 66 and the metering valve 64 to bias the metering valve 64 in the direction of fluid flow toward the actuator port 26. The spring 65 is yieldable to be slightly further compressed in response to any one of three conditions described below. To adjust the setting of the metering valve 64, there is provided the manual actuator control 13 of FIG. 1 which is in the nature of a dial and knob secured to the outer end of a manual actuator shaft 67. The actuator shaft 67 is rotatably supported by an actuator sleeve 68 which supports the manual actuator control 14. The manual actuator sleeve 68 is rotatably supported by the body 19 in the bore 63. The metering valve 64 has a guide stem 69 extending into and slidably guided by one end of the sleeve actuator 68. A relatively fine set of threads 70 are carried by the actuator shaft 67 and the actuator sleeve 68 and enable fine adjustment of the axial position of the actuator shaft 67. Preferably, these threads are of the left-hand type so that rotation of the dial and knob of the actuator control 13 in a clockwise direction produces a reduction in metered flow rate. Leakage from the bore 63 is prevented by an O-ring 71 acting between the actuator shaft 67 and the interior of the actuator sleeve 68, by an O-ring 72 acting between the actuator sleeve 68 and the body 19, and by an O-ring 73 acting between the plug or cap 66 and the body 19.

The sealing cap 66 has a central bore within which there is disposed a check valve 74 which has a tubular skirt 75 that is slidably guided in the sealing cap 66. A further spring 76 acts between the sealing cap 66 and the check valve 74 to bias it in the direction of fluid flow toward the actuator port 26. The enlarged end of the bore 63 within which the sealing cap 66 is disposed defines a shoulder 77 which provides a stationary valve seat against which the check valve 74 is biased by the spring 76.

The check valve 74 has a central opening 78 which defines a metering valve seat which coacts with the tapered metering valve 64. Between the seat 77 and the sealing cap 66, skirt 75 of the check valve 74 is provided with openings 79 which communicate the passage portion 66 with the interior of the check valve 74.

As the check valve 74 is normally biased by the spring 76 against the seat 77, it normally blocks fluid flow to the actuator port 26. However, when fluid is being returned so that it enters by means of the actuator port 26, such fluid acts on the check valve 74 to open it, doing so against the force of the spring 76. Such opening of the check valve 74 may close the metering valve 64. Because of the yieldability of the spring 65 and the slidable support provided for the stem 69 of the metering valve 64, the metering valve 64 will move with the check valve as the check valve 74 opens further, but as soon as return flow has been completed, the springs 65 and 76 restore the metering valve 64 and the check valve 74 to the position illustrated. By turning the actuator shaft 67 in either direction, the effective size or flow area of the space between the metering valve 64 and its valve seat may be adjusted, whereby a slow finely adjustable rate of movement may be provided to the table 11. Such movement is in the cutting direction.

Under certain circumstances, the actuator sleeve 68 may have its lower end disposed substantially against the check valve 74. To make certain that the adjustment of the metering valve controls the feed rate, there is provided an annular passage 85 about the stem 69 which communicates through a radial opening 89 with the actuator port 26. The coaction of the metering valve 64 and the check valve 74 thus provides for finely adjustable slow movement of the actuator 15 in one direction and rapid movement thereof in the opposite direction.

Under certain circumstances, it is desirable to advance the table relatively fast in the cutting direction, for instance to bring the workpiece up to the saw or to feed the workpiece rapidly while the saw is in an opening in the workpiece. Such movement is provided by the actuator sleeve 68 which has the manual actuator handle as shown in FIG. 1 at 14. As shown in FIG. 7, the actuator sleeve 68 has a diagonally extending groove 80 within which there is seated a ball 81 shown in FIG. 6, the ball 81 being held in place by a set screw 82 and jam nut 83. The ball 81 is retained against displacement by being disposed in a recess 84 in the body 19. When the manual actuator handle 14 is actuated, the actuator sleeve 68 is thereby rotated, and such rotary motion is converted into axial motion by the ball 81 so that the actuator sleeve 68 engages and unseats the check valve 74. As the check valve 74 is connected in parallel with the metering valve 64, fluid is now enabled to flow in a substantially unrestricted manner past the seat 77 and directly out through the actuator port 26. With initial actuation of the actuator sleeve 68, the actuator shaft 67 is correspondingly moved, and hence the metering valve 64 is similarly shifted. Thereby, the spring 65 allows the metering valve 64 to be shifted with the check valve 74 and the actuator stem or shaft 67 and the actuator sleeve 68. During such high speed feeding of fluid to the actuator port 26, the setting of the metering valve 64 is not disturbed and on release of the manual actuator handle 14, the springs 65 and 76, aided by fluid pressure, will restore the components to the position illustrated.

By removal of one of the plugs 60, 62, access may be had to the portion of the passage lying between the sleeve groove 31 and the parallel disposed metering and check valves 64, 74. Such construction enables the slide valve 32 to deliver fluid to some other component (not shown) than the actuator 15 without the flow thereto being governed by the metering valve 64 and the check valve 74. Such construction also enables fluid flow to be delivered to the metering valve 64 and check valve 74 from an external source other than the slide valve 32, such as a foot-actuated 4-way valve, for thereby placing fluid flow therethrough under the control of the check valve 74 and metering valve 64.

I claim as my invention:
1. A control valve comprising:
   (a) a body having
      (1) a first bore,
      (2) a second bore extending transversely adjacent to said first bore,
      (3) an inlet port, a return port and two actuator ports,
      (4) three passages respectively connecting three of said ports to said first bore, and a fourth passage extending in a straight line through the fourth of said ports and transversely across said second bore to said first bore;
   (b) a slide valve disposed in said first bore for movement in the direction of its length for controlling fluid flow between said ports;
   (c) a rotatable shaft sealably supported by said body in said second bore and extending into said fourth passage; and
   (d) an externally threaded finger adjustably extending through a threaded diametric opening in said rotatable shaft into a recess in said slide valve, and adjustable in the direction of said fourth passage by means of a tool inserted through said fourth port.
2. A control valve comprising:
   (a) a body having
      (1) a bore,
      (2) an inlet port, a return port and two actuator ports,
      (3) a first continually open passage connecting one of said inlet and return ports to one end of said bore, and
      (4) three additional passages respectively connecting one of said actuator ports, the other of said return and inlet ports, and the other of said actuator ports to three openings into said bore which openings are axially spaced along the length of said bore;
   (b) a slide valve having an axial bore open at both ends to said body bore, and movable axially in said body bore from a central position to two actuator-operating positions respectively nearer the ends of said body bore, said slide valve having a radial opening for communicating its axial bore with a selected one of said three additional passages;
   (c) groove and land structure on said slide valve for blocking both of said actuator port passages when said slide valve is centrally disposed, and for coupling either one of the actuator port passages to the center port passage when said radial opening is aligned with the other of the actuator port passages; and
   (d) an actuator means carried by said body and extending sealably into said bore for selectably positioning said slide valve in one of said three positions.
3. A control valve according to claim 2 wherein said radial opening is aligned with the center port passage when said slide valve is in said center position to couple said inlet port to said return port.
4. A control valve comprising:
   (a) a body having a valve seat in a passage terminating at its ends in a pair of ports;
   (b) a normally closed check valve carried by said body in said passage between said ports against said seat for blocking fluid flow in one direction and for enabling substantially unrestrained fluid flow in the opposite direction, said check valve having a passage therethrough including a metering valve seat facing in said opposite direction;
   (c) a metering valve biased to close said metering valve seat;
   (d) a first manual actuator means adjustably supported and guided by said body and engageable with said check valve for opening it; and
   (e) a separate second manual actuator means carried by said body for selectably adjusting said metering valve without altering the position of said first manual actuator.
5. A control valve according to claim 4, in which said second manual actuator is adjustably carried on said first manual actuator whereby their positions with respect to each other can be adjusted.
6. A control valve according to claim 4, in which said metering valve has a stem projecting through said metering valve seat, said stem having a sliding fit with and being guided by said first actuator and being adjustably engaged by said second actuator.

References Cited

UNITED STATES PATENTS

| 874,113 | 12/1907 | Peck | 137—599.2 XR |
|---|---|---|---|
| 2,505,710 | 4/1950 | Hayden | 137—625.68 |
| 2,590,137 | 3/1952 | Towler et al. | 137—625.68 XR |
| 2,696,219 | 12/1954 | Barksdale | 251—286 XR |
| 3,025,838 | 3/1962 | Klancnik | 137—596.12 XR |
| 3,032,063 | 5/1961 | Wells | 137—599.2 |
| 3,095,903 | 7/1963 | Jennings | 137—625.68 |
| 3,221,770 | 12/1965 | Faisandier | 137—625.68 XR |
| 3,247,867 | 4/1966 | Martin | 137—596.2 |

FOREIGN PATENTS 179,854  5/1922  Great Britain.

HENRY T. KLINKSIEK, Primary Examiner

U.S. Cl. X.R.

137—599.2, 625.68